(12) United States Patent
Field

(10) Patent No.: X8674
(45) Date of Patent: Mar. 6, 1835

(54) SAW, USE OF

(76) Inventor: Anson Field

Anson Field, Jericho, Vermont.
Letters Patent, dated 6th. March. 1835.

The Schedule referred to in these Letters Patent and making part of the same, containing a description in the words of the said Anson Field himself, of his improvement in the use of the saw.

To all to whom these Presents shall come:

Be it known that I, Anson Field of Jericho in the County of Chittenden and State of Vermont, have invented a new and useful improvement in the use of the saw, and that the following is a full and exact description thereof: on each side of the saw plate at the back edge is bolted or riveted a slip of iron or wood of the width & thickness most convenient; the bolts or rivets passing through the saw plate. The saw plate is but little if any wider at the end where it begins to cut than the slips attached to it, and gradually increases in width to the back end. The saw thus confined between the two slips is to slide in a groove or run upon rollers between two timbers as may be most convenient, and to run in a horizontal, perpendicular, or angling direction, as may best suit the operator. The machine thus made to be located where thought best; the timber to be cut, confined to it across the channel in which the saw runs, as may be most convenient, and the saw propelled by hand or horse or steam or water power by means of any ....: Machinery thought best to attached to it. The machine may be used to advantage in many trades, but the chief design is for cutting fire wood. By this process a stick of timber of any size may be taken off by one sweep of the saw, provided it be of sufficient length and width at the back end. The saw may be graduated so as to cut from half an inch to 2 inches to the foot, according to the size, and nature of the timber to be cut. What I claim as my own invention and not previously known in the above described machine is, the manner of confining it between the two slips, the way in which it slides & the principle on which it cuts, viz: being so confined as to cut at one sweep the entire width of the saw above the slips. In testimony that the above is full & exact description of the construction & use of my machine as improved by me I have hereunto set my hand this fifth day of February eighteen hundred and thirty five.

Anson Field

Witness,
Henry Stone
Robert Clarke

Ed
WR 500 words